United States Patent
Cookson et al.

(10) Patent No.: US 9,840,578 B2
(45) Date of Patent: Dec. 12, 2017

(54) POLYISOCYANATE POLYADDITION POLYOL MANUFACTURING PROCESS AND PRODUCT

(71) Applicant: DOW GLOBAL TECHNOLOGIES LLC, Midland, MI (US)

(72) Inventors: Paul Cookson, Samstagern (CH); Francois Casati, Pfaffikon (CH); Ricco Borella, Schindellegi (CH); Daniel Hoehener, Dubendorf (CH); Irena Amici-Kroutilova, Waedenswil (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/912,075

(22) PCT Filed: Sep. 11, 2014

(86) PCT No.: PCT/US2014/055263
§ 371 (c)(1),
(2) Date: Feb. 12, 2016

(87) PCT Pub. No.: WO2015/038826
PCT Pub. Date: Mar. 19, 2015

(65) Prior Publication Data
US 2016/0194434 A1 Jul. 7, 2016

Related U.S. Application Data

(60) Provisional application No. 61/877,290, filed on Sep. 13, 2013, provisional application No. 61/954,259, filed on Mar. 17, 2014, provisional application No. 61/954,137, filed on Mar. 17, 2014.

(51) Int. Cl.
| | | |
|---|---|---|
| *C08G 18/66* | (2006.01) | |
| *C08G 18/20* | (2006.01) | |
| *C08G 18/24* | (2006.01) | |
| *C08G 18/22* | (2006.01) | |
| *C08G 18/32* | (2006.01) | |
| *C08G 18/08* | (2006.01) | |
| *C08G 18/76* | (2006.01) | |
| *C08G 18/48* | (2006.01) | |

(52) U.S. Cl.
CPC ..... *C08G 18/6688* (2013.01); *C08G 18/0876* (2013.01); *C08G 18/2063* (2013.01); *C08G 18/222* (2013.01); *C08G 18/244* (2013.01); *C08G 18/246* (2013.01); *C08G 18/3281* (2013.01); *C08G 18/4837* (2013.01); *C08G 18/4866* (2013.01); *C08G 18/7621* (2013.01); *C08G 18/7664* (2013.01)

(58) Field of Classification Search
CPC ............ C08G 18/6688; C08G 18/4837; C08G 18/7621; C08G 18/7664; C08G 18/0876; C08G 18/4866; C08G 18/222; C08G 18/244; C08G 18/246; C08G 18/3281; C08G 18/2063

See application file for complete search history.

(56) References Cited

U.S. PATENT DOCUMENTS

| | | |
|---|---|---|
| 4,305,857 A | 12/1981 | Reischl |
| 4,374,209 A | 2/1983 | Rowlands |
| 4,518,778 A | 5/1985 | Cuscurida |
| 5,068,280 A | 11/1991 | Pal |

FOREIGN PATENT DOCUMENTS

| | | | |
|---|---|---|---|
| EP | 776922 A | | 6/1997 |
| WO | WO 99/60045 | * | 11/1999 |
| WO | 2014/037558 A | | 3/2014 |

* cited by examiner

*Primary Examiner* — Rabon Sergent

(57) ABSTRACT

PIPA polyols are made in a two-step process. In the first step, a base polyether polyol and a polyisocyanate are reacted to form a mixture that contains unreacted base polyol, unreacted polyisocyanate and adducts of the base polyol and polyisocyanate. A low equivalent weight polyol is then added and reacted in a second step to form the dispersion. The process unexpectedly produces a stable dispersion of the fine PIPA particles in the base polyol, even when the base polyol contains mostly secondary hydroxyl groups. The process also permits the tuning of product viscosity by increasing or decreasing the extent of reaction in the first step.

18 Claims, No Drawings

POLYISOCYANATE POLYADDITION POLYOL MANUFACTURING PROCESS AND PRODUCT

This invention relates to a method for making dispersions of polyisocyanate polyaddition particles in a polyol useful for the production of flexible polyurethane foam.

Various types of "polymer polyols" are used widely as raw materials for manufacturing flexible polyurethane foam and other polyurethane products. They have a continuous phase made up of one or more compounds having multiple hydroxyl groups (i.e., a "base polyol") into which another polymer is dispersed in the form of small particles. When the polymer polyol is used to make a polyurethane foam, the dispersed polymer particles help to form open cells and to increase the load-bearing of the foam.

Several different types of polymer polyols are produced industrially. One type is known as a "polyisocyanate polyaddition" polyol, or "PIPA" polyol made by the reaction of a low equivalent weight polyol with a polyisocyanate in presence of a base polyol. The dispersed polymer phase is a polyurethane or polyurethane-urea polymer.

An important attribute of all polymer polyol products is the stability over time of the dispersion. The dispersed polymer phase has a strong tendency to separate out from the liquid phase. Therefore, some means of stabilization is needed.

Grafting methods are very commonly used to stabilize the dispersion. Grafting bonds the disperse phase particles to base polyol molecules, which helps to maintain the particles in suspension. PIPA polyols are formed by reacting a low equivalent weight polyol with a polyisocyanate. This reaction which forms the disperse phase is performed in situ, while the reactants are dispersed or dissolved in the base polyol. Because the base polyol has hydroxyl groups that are reactive with isocyanate groups, the base polyol can to some extent compete with the low equivalent weight polyol for reaction with the isocyanate groups. The reaction between the base polyol and polyisocyanate can result in some grafting.

It is important, however, that the reaction between the low equivalent weight polyol and the polyisocyanate predominates. Otherwise, the reaction of base polyol and polyisocyanate forms a highly viscous product which contains little or no dispersed polymer phase. To produce a useful product, therefore, the reaction that forms the disperse phase must be carefully balanced with the grafting reaction. This is achieved mainly through the selection of the base polyol and the low equivalent weight polyol. The low equivalent weight polyol needs to be more highly reactive towards isocyanate groups than the base polyol.

On the other hand, if the base polyol reacts too slowly, insufficient grafting will occur and the PIPA polymer particles will not be stable in the base polyol. This is the case when the base polyol contains mainly secondary hydroxyl groups. The secondary hydroxyl groups react too slowly with isocyanate groups in PIPA manufacturing processes to produce the needed grafting.

For this reason, current commercial PIPA polyols are made using a base polyol mainly terminated with primary hydroxyl groups.

This is a very significant limitation on the types of PIPA polyol products that can be produced, and on the applications in which those PIPA polyols can be used. The most commercially important polyurethane-manufacturing process by far is conventional flexible slabstock foam. Conventional polyurethane foams are based on the use of polyols that contain mainly secondary hydroxyl groups. The slower reactivity of these secondary hydroxyl groups (compared to primary hydroxyls) fits well with the reactivity profile needed in high-volume flexible slabstock foam production. Polyols having mainly primary hydroxyl groups are very seldom used in this application, because those polyols are too reactive, and because their performance is extremely sensitive to the levels of tin catalyst in the formulation. Many commercial slabstock foaming lines are not capable of maintaining tin catalyst levels within the very tight windows required when primary hydroxyl-terminated polyethers are used.

The difficulty in producing stable PIPA polyols using a mainly secondary hydroxyl-terminated base polyol effectively excludes PIPA polyols from this very broad market. Hence, current commercial PIPA polyols are used mainly for making high resiliency foam, which is made in a process that can tolerate the higher reactivity of the PIPA polyols.

Another problem with making PIPA dispersions using polyols designed for conventional slabstock foam is that the molecular weights of the polyols tends to be lower than those used in other foam applications. The viscosities of the polyols are correspondingly lower. Whereas low viscosity is a desirable attribute of the dispersion for processing reasons, it is often more difficult to form stable dispersions if the polyol viscosity is very low. Polyols designed for conventional slabstock formulations tend to be nominal triols having molecular weights of 2000 to 4000, and due to their low viscosities are less prone to physically stabilize suspended particles than are higher molecular weight polyols commonly used in making molded or high resiliency slabstock foam. This further complicates the stabilization of PIPA particles, in addition to the presence of secondary hydroxyls.

Certain attempts to make stable PIPA polyols using a mainly secondary hydroxyl-terminated base polyol have been made, but none has resulted in a commercially viable approach.

U.S. Pat. No. 4,305,857 describes a process for making a PIPA polyol, in which large quantities of water are added to the formulation. Emulsifying substances can be used in conjunction with the water to control particle size distribution and final viscosity of the dispersion (see column 10, line 63 to 65, and column 12, lines 18 to 21). The need to use large amounts of water causes several significant problems. Much of the excess water must be removed from the product, which leads to very significant increases in energy and equipment costs. It is difficult to remove the water to very low levels, which presents a very significant problem with product quality and consistency from batch-to-batch. The emulsifying substances described in U.S. Pat. No. 4,305,857 are mainly based on poly(ethylene oxide), which is very hydrophilic. The presence of these emulsifiers in the PIPA polyol can cause a foam made from the PIPA polyol to be unacceptably hydrophilic, which can lead to problems with foam properties.

Previously-formed PIPA polyols (see, e.g. WO 94/20558 and WO 2012/154820), as well as silicone compounds or other types of surfactants also have been tried as stabilizers for PIPA polyols. However the PIPA polyol products described in these patents are based on the use of a carrier polyol containing a high level of highly reactive primary hydroxyls. These approaches have not been found to be effective when the base polyol is mainly terminated in secondary hydroxyl groups.

In U.S. Pat. No. 4,518,778, the problem of instability is addressed by make the PIPA particles from an alkylene oxide adduct of an alkanolamine, instead of the alkanolamine itself. As the examples in U.S. Pat. No. 4,518,778 show, PIPA polyols made in a secondary hydroxyl-terminated base polyol are not stable when triethanolamine is used as a starting material. This approach requires special starting materials and therefore increases cost. Furthermore, it has not resulted in a commercially feasible process, at least in connection with a base polyol mainly terminated in secondary hydroxyl groups. U.S. Pat. No. 4,374,209 includes examples based on secondary hydroxyl based carrier polyol and diethanolamine, no indication is given of the final product viscosity and particle size distribution. EP 776,922 includes an example of a dispersion in which the base polyol contains mainly secondary hydroxyl groups and triethanolamine is used as a reactant to make the polyurethane particles, but does not provide particle size or dispersion stability information. These approaches have failed to lead to the successful commercial production of a PIPA polyol in which the base polyol has mainly secondary hydroxyl groups. WO 2014/037558 also includes an example of a PIPA dispersion in which the base polyol contains 90% secondary hydroxyl groups, but like EP 776,922 does not provide particle size or dispersion stability information.

U.S. Pat. No. 5,068,280 describes a process in which a seed PIPA dispersion is made in a base polyol having mainly primary hydroxyl groups, and the seed PIPA dispersion is then used to make a second PIPA dispersion. The base polyol in the second PIPA dispersion is terminated mainly with secondary hydroxyl groups. This process requires preheating of components, slow addition of the polyisocyanate and a long reaction time, to produce a dispersion having a bimodal particle size. The process also introduces a significant amount of primary hydroxyl groups into the final product, which can affect its reactivity in ways that make the produce less suitable for conventional slabstock foam manufacturing.

What is desired is an inexpensive, reproducible process by which a stable PIPA polyol can be prepared in a base polyol that has predominantly secondary hydroxyl groups.

This invention is a process for preparing a dispersion of polyisocyanate polyaddition particles in a base polyol, comprising a) combining (1) 1 to 50 parts by weight of a polyisocyanate having an isocyanate equivalent weight of up to 300 and (2) 100 parts by weight of one or more liquid base polyether polyols, the base polyether polyol(s) having an average hydroxyl equivalent weight of at least 200, a nominal hydroxyl functionality of at least 2.5, wherein at least 75% of the hydroxyl groups of the base polyol are secondary hydroxyl groups, and reacting the polyisocyanate with the polyether polyol while mixing to produce a mixture containing unreacted base polyol, unreacted polyisocyanate compound and one or more isocyanate group-containing adducts of the base polyol with the polyisocyanate;

b) then dispersing (3) a low equivalent weight polyol having an equivalent weight of up to 80 and 2 to 6 hydroxyl groups per molecule and optionally additional polyisocyanate into the mixture formed in step a), provided enough of the low equivalent weight polyol is provided to consume the isocyanate groups provided by the mixture formed in step a) and additional polyisocyanate if any, and reacting the low equivalent weight polyol with the isocyanate groups to form polyisocyanate polyaddition particles dispersed in the base polyether polyol.

This process is contrary to the usual practice for producing PIPA dispersions, in which the low equivalent weight polyol is first dispersed into the base polyol, followed by adding the polyisocyanate and performing the reaction. Surprisingly, this process produces a highly stable PIPA polyol in a simple, inexpensive process. The dispersed polyisocyanate polyaddition particles tend to have desirably small particles sizes. The dispersion tends to be highly stable and in many cases resists settling and particle agglomeration even over periods of several months. Unlike other commercially available PIPA polyol products, the product of this process, by virtue of having mainly secondary hydroxyl groups, is suitable for use in major polyurethane-forming processes like slabstock conventional flexible foam production.

An advantage of the invention is that the final product viscosity can be fine tuned to specific foam production needs by simply changing the extent to which the polyisocyanate and base polyol are reacted together in step (a). Product viscosity increases as more of the polyisocyanate reacts with the base polyol. The amount of reaction that occurs during step (a) can be controlled through manipulation of several variables, such as, for example, the amount of time the base polyol and polyisocyanate are pre-reacted, the pre-reaction temperature, and the amount and/or type of catalyst.

Another advantage of the invention is that few if any monofunctional or non-reactive species are introduced into the base polyol mixture formed during step (a) of the process. Therefore, the functionality (average number of hydroxyl groups per molecule) of the continuous polyol phase remains high, and good quality polyurethanes are easily made from the product of this invention.

Yet another advantage of this invention is the process does not require any previously formed, specially made stabilizer (although such an additional stabilizer may be included if desired). Quite importantly, the process does not require the presence of water, which can be omitted entirely or may be present in only small amounts.

The base polyether polyol(s) used as a starting material in this invention has a nominal functionality of at least 2.5. By "nominal" functionality, it is meant the average number of oxyalkylatable hydrogens per molecule of the initiator(s) used in making the base polyol. The nominal functionality preferably is at least 2.8 and more preferably at least 3.0. It may be as high as 6.0, but more preferably is no more than 4.0.

At least 75% of the hydroxyl groups of the base polyol are secondary hydroxyls. The hydroxyl groups of the base polyol may be at least 85%, at least 92%, at least 95% or at least 98% secondary hydroxyls. Conversely, no more than 25%, no more than 15%, no more than 8%, no more than 5% or no more than 2% of the hydroxyl groups of the base polyol may be primary hydroxyls.

The base polyol preferably is a homopolymer or copolymer of propylene oxide. Homopolymers of propylene oxide typically contain very small if any quantities of primary hydroxyl groups—typical amounts of primary hydroxyl groups being 0 to about 10% of the total number of hydroxyl groups. The selection of catalyst can affect the number of primary hydroxyl groups present. For instance, typically less than 2% of the hydroxyl groups of propylene oxide homopolymers made with alkali metal catalysts are primary hydroxyl groups, whereas up to about 8% of the hydroxyl groups of propylene oxide homopolymers made using double metal cyanide catalyst complexes can be primary hydroxyl groups.

Useful copolymers of propylene oxide include random copolymers of propylene oxide and ethylene oxide, provided the copolymer contains a low proportion of primary hydroxyl groups as described above. These are prepared by polymerizing a mixture of propylene oxide and ethylene oxide. The mixture preferably contains at least 80% by weight propylene oxide and no more than 20% ethylene oxide. A more preferred mixture contains 85 to 99.5% by weight propylene oxide and 0.5 to 15% by weight ethylene oxide.

Another useful copolymer of propylene oxide is a block copolymer containing one or more internal blocks of polymerized ethylene oxide and terminal blocks of polymerized propylene oxide, once again provided the copolymer contains a proportion of primary hydroxyl groups as described before. The ethylene oxide block or blocks can in the aggregate constitute 0.5 to 30% of the weight of the copolymer, although a preferred weight of the block or blocks is 0.5 to 20%, especially 0.5 to 15%, of the total weight of the copolymer.

The base polyol can be prepared by polymerizing the oxide or oxides in the presence of an initiator compound or mixture of initiator compounds and an alkoxylation catalyst such as an alkali metal hydroxide like potassium hydroxide or a double metal cyanide catalyst complex such as a zinc hexacyanocobaltate catalyst complex. If a single initiator compound is used, that compound preferably contains at least three oxyalkylatable hydrogen atoms. Hydroxyl groups, primary amine groups, secondary amine groups and thiol groups are examples of groups that contain oxyalkylatable hydrogen atoms. Primary amine groups contain two oxyalkylatable hydrogens. In some embodiments, the base polyol contains hydroxyl groups but no primary, secondary or tertiary amine groups. Examples of compounds that can be used by themselves as initiator compounds are glycerin, trimethylolpropane, trimethylolethane, pentaerythritol, erythritol, sucrose, sorbitol, mannitol, diethanol amine, monoethanolamine, triethanolamine, ethylene diamine, toluene diamine, 1,2-propane diamine, and the like. Mixtures of two or more of the foregoing initiators can be used.

Difunctional initiators that have only two oxyalkylatable groups can be used in a mixture with one or more of the foregoing initiators, provided the mixture has an average of at least 2.5 hydroxyl groups per molecule. Examples of such difunctional initiators include water, ethylene glycol, 1,2-propane diol, 1,3-propane diol, diethylene glycol, dipropylene glycol, triethylene glycol, tripropylene glycol, cyclohexanedimethanol, methyl amine, ethyl amine, and the like.

The base polyol may also be a mixture of polyether polyols, each made separately using a different initiator, and each having a hydroxyl equivalent weight as described below, which are then blended to form a mixture having an average functionality as described before.

The hydroxyl equivalent weight of the base polyol is at least 200, and may be as high as about 6000. A preferred hydroxyl equivalent weight is 360 to 3000, especially 500 to 2000 or 900 to 1350. If the base polyol is a mixture of two or more separately made polyether polyols, each of the separately made polyols should have hydroxyl equivalent weights within these ranges.

An especially preferred base polyol is a nominally trifunctional poly(propylene oxide) homopolymer or nominally trifunctional random copolymer of 80 to 99.5% by weight propylene oxide and 0.5 to 20% by weight ethylene oxide, having a hydroxyl equivalent weight of 800 to 2000, especially 900 to 1350, in which 92 to 100%, more preferably 98 to 100% of the hydroxyl groups secondary hydroxyl groups, or a mixture of two or more such polyols.

In step (a) of the process of this invention, the base polyol is partially reacted with one or more polyisocyanates having an isocyanate equivalent weight of up to 300. The isocyanate equivalent weight is preferably up to 225, and more preferably up to 175. The isocyanate equivalent weight is preferably at least 50, more preferably at least 70. Aromatic, cycloaliphatic and aliphatic isocyanates are all suitable, although aromatic polyisocyanates are generally preferred on the basis of cost, availability and good reactivity.

Examples of polyisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, 1,3- and/or 1,4-bis(isocyanatomethyl)cyclohexane (including cis- and/or trans isomers) methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used.

The amount of polyisocyanate is 1 to 50 parts by weight per 100 parts by weight of base polyol. Within this broad range, the amount of polyisocyanate is selected such that, after reaction with the low equivalent weight polyol in step (b), the desired solids level is obtained. Amounts of polyisocyanate at the higher end of this range produce higher solids products (assuming enough of the low equivalent weight polyol is provided in step (b)). An excess of isocyanate groups is generally present during step (a).

A preferred amount of polyisocyanate is at least 2 parts, more preferably at least 3 parts, per 100 parts by weight of base polyol. A preferred upper amount is up to 20 parts, and a still more preferred amount is up to 15 parts by weight per 100 parts by weight of the base polyol. In some specific embodiments, 3 to 10 or 3 to 7 parts by weight of polyisocyanate are combined with 100 parts by weight of base polyol. The amount of polyisocyanate in any instance is selected together with the amount of low equivalent weight polyol to produce a desired solids level in the product.

The base polyol and polyisocyanate react in step (a) of the process to form a mixture that includes unreacted base polyol, unreacted polyisocyanate compound and one or more isocyanate-containing adducts (reaction products) of the base polyol with the polyisocyanate.

The extent of reaction is controlled such that neither the base polyol nor the polyisocyanate are completely consumed, so unreacted base polyol and unreacted polyisocyanate remain in the mixture obtained from step (a) of the process. It is generally preferred to continue the reaction until 0.1 to 30% of the isocyanate groups of the polyisocyanate are consumed. It is more preferred to continue the reaction until 0.1 to 25% or 0.1 to 15% of the isocyanate groups are consumed.

The extent to which the reaction proceeds is in general depends on factors such as (1) the particular base polyol and polyisocyanate used, (2) the temperature at which the reaction takes place, (3) the length of time the starting materials are permitted to react and (4) the presence or absence of a catalyst and, if a catalyst is present, the selection of the type and amount thereof. It will be appreciated that these factors are not independent of each other.

The reaction of base polyol and polyisocyanate may be performed at a temperature of, for example, 10 to 80° C. An elevated temperature may be desirable to reduce reaction time, but this is often not necessary, and it may become more difficult to control the extent of reaction if the temperature is too high. Typically, the base polyol, polyisocyanate and catalyst are mixed while the components are at a temperature of 10 to 80°, preferably 15 to 70° C. and more preferably 20 to 60° C. The mixture is then allowed to react. This can be done without further applied heat if desired. The reaction of the base polyol and polyisocyanate is exothermic and may result in a small temperature increase even if no heat is applied. Cooling may be applied to control the temperature increase due to the exotherm, if desired.

The reaction time needed for the pre-reaction of base polyol and polyisocyanate typically is quite short. The reaction time may be at least 5 seconds, at least 30 seconds, at least 60 seconds, or at least 90 seconds. The reaction time may in some cases be as much as 15 or 20 minutes, although more typically the reaction is completed to the extent needed in 5 minutes of less and often in three minutes or less.

It is preferred to perform step (a) in the presence of a urethane catalyst. The urethane catalyst is a material which catalyzes the reaction of a hydroxyl group with an isocyanate group. Suitable catalysts include, for example, tertiary amines, cyclic amidines, tertiary phosphines, various metal chelates, acid metal salts, strong bases, various metal alcoholates and phenolates and metal salts of organic acids. Catalysts of most importance are tertiary amine catalysts, cyclic amidines, and tin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

Examples of tin catalysts are stannic chloride, stannous chloride, stannous octoate, stannous oleate, dimethyltin dilaurate, dibutyltin dilaurate, other organotin compounds of the formula $SnR_n(OR)_{4-n}$, wherein R is alkyl or aryl and n is 0-2, and the like. Commercially available organotin catalysts of interest include Dabco™ T-9 and T-95 catalysts (both stannous octoate compositions available from Air Products and Chemicals). Tin catalysts are generally used in conjunction with one or more tertiary amine catalysts, if used at all. Tin catalysts tend to be strong gelling catalysts, so they are preferably used in small amount, if used at all. It has been found that the use of tin catalysts can have a deleterious effect on the stability of the dispersion, especially when the dispersion is produced at a solids level of greater than 10%, such as 15 to 40% and when the low equivalent weight polyol is triethanolamine. In addition, in some jurisdictions tin catalysts are facing governmental regulations that may limit their use. Therefore, it is preferred to omit tin catalysts, and to use instead one or more urethane catalysts that do not contain tin.

In some embodiments, the catalyst and the process conditions are such that no trimerization of the polyisocyanate takes place during step a), as trimerization consumes isocyanate groups and makes them unavailable for reaction with the low equivalent weight polyol in step b). For that purpose, isocyanate trimerization catalysts such as quaternary ammonium salts, alkali metal salts such as potassium acetate and potassium formate, substituted triazines, aminophenols, guanidines, and similar compounds preferably are avoided in step a). If the base polyol is made using alkali metal or other catalyst that strongly promotes isocyanate trimerization, that catalyst preferably is removed from the base polyol before performing the process of this invention.

The urethane catalyst is typically used in small amounts, for example, each catalyst being employed from about 0.0015 to about 5% by weight of the high equivalent weight polyol.

The catalyst and polyisocyanate can be combined with the base polyol in any order. Thus, the catalyst can be combined with the base polyol prior to adding the polyisocyanate, or, alternatively, the polyisocyanate can be combined with the base polyol prior to adding the catalyst. The catalyst and polyisocyanate can be simultaneously combined with the base polyol.

In a specific embodiment, step (a) of the process is performed at a temperature of 20 to 60° C., for a period of 30 seconds to five minutes, in the presence of a urethane catalyst. Heat or cooling can be applied during step (a) to maintain such temperatures as needed or desired.

This pre-reaction of the base polyol and polyisocyanate should be performed in the absence or near absence (such as up to 1 weight percent or up to 0.25 weight percent, based on total weight of reactants) of the low equivalent weight polyol.

The pre-reaction produces a mixture of unreacted base polyol, unreacted polyisocyanate compound and one or more adducts (reaction products) of the base polyol with the polyisocyanate. The adduct molecules typically contain at least one hydroxyl group, preferably at least two hydroxyl groups, and at least one isocyanate group. The adduct formed in the reaction of the base polyol and polyisocyanate is believed to mainly consist of a reaction product of one molecule of base polyol and one molecule of polyisocyanate. When the base polyol contains more than two hydroxyl groups, the adduct is predominantly a molecule that contains two or more hydroxyl groups and one or more isocyanate groups. In the specific case of a nominally trifunctional base polyol and a diisocyanate, the predominant adduct molecule is believed to have two hydroxyl groups and one isocyanate group. Smaller quantities of other reaction products (such as the reaction product of two moles of base polyol and one mole of the polyisocyanate or of one mole of base polyol and two moles of the polyisocyanate) can also form.

The formation of the adduct tends to increase the viscosity of the product mixture; therefore, in some embodiments the extent of reaction during step (a) of the process is controlled to achieve a specific viscosity as may be advantageous in a particular target application.

A low equivalent weight polyol is then combined with the product of the foregoing step and reacted with remaining isocyanate groups of the isocyanate compound and/or adduct molecules to form polyisocyanate polyaddition particles.

The low equivalent weight polyol preferably has 2 to 6, preferably 2 to 3, hydroxyl groups per molecule. It may contain zero, one, or more amine hydrogens in addition to the hydroxyl groups. It preferably contains zero or one amine hydrogen. It is preferred that it contains at least two primary hydroxyl groups (and optionally one or more secondary hydroxyl groups as well), and/or is an aminoalcohol.

Aminoalcohol compounds are preferred types. The equivalent weight per hydroxyl group preferably is up to 80, and more preferably up to 75.

The low equivalent weight polyol preferably has low miscibility in the base polyol, such that, at the relative amounts used in the process, the low equivalent weight polyol disperses in the base polyol in the form of small droplets.

Examples of low equivalent weight polyols are ethylene glycol, diethylene glycol, triethylene glycol, 1,3-propane diol, 1,2-propane diol, dipropylene glycol, tripropylene glycol, glycerin, trimethylolpropane, trimethylolethane, pentaerythritol, erythritol, sucrose, diethanolamine, triethanolamine, triisopropanolamine, diisopropanolamine, and the like. Mixtures of two or more of the foregoing can be used.

Triethanolamine is a highly preferred low equivalent weight polyol. Triethanolamine can be used by itself or as a mixture with one or more other low equivalent weight polyols as described above. Such a mixture may contain, for example, 75 to 99.9% by weight triethanolamine.

The low equivalent weight polyol is dispersed into the base polyol mixture formed in the foregoing step. The dispersing step can be conducted in any convenient way, using any convenient apparatus, such as various types of agitated vessels, static mixing devices, ultrasonic mixing devices or other mechanical agitation devices. In preferred embodiments, the low equivalent weight polyol is dispersed to form fine droplets in the base polyol and isocyanate mixture.

A previously formed PIPA polyol can be included with the base polyol if desired. This may provide additional stabilization. If a previously formed PIPA polyol is present, it is preferred to add enough of the previously formed PIPA polyol to provide 0.05 to 5.0 parts, preferably 0.05 to 2 parts and more preferably 0.05 to 1 part by weight of PIPA particles per 100 parts by weight base polyol. The continuous polyol phase of any such PIPA polyol is considered as part of the base polyol in this invention. The continuous polyol phase of the previously formed polyol preferably contains at least 75% of the hydroxyl groups are secondary hydroxyl groups, and most preferably is a nominally trifunctional poly(propylene oxide) homopolymer or nominally trifunctional random copolymer of 80 to 99.5% by weight propylene oxide and 0.5 to 20% by weight ethylene oxide, having a hydroxyl equivalent weight of 800 to 2000, especially 900 to 1350, and in which 92 to 100%, more preferably 98 to 100%, of the hydroxyl groups are secondary hydroxyl groups, or a mixture of two or more such polyols.

Other stabilizers such as silicone surfactants may be included, but preferably are omitted.

Water is not needed in the process. If water is present, it is preferably present in small amounts, such as less than 2%, less than 1%, less than 0.5% and especially less than 0.25% by weight, based on the combined weight of the base polyol, polyisocyanate, low equivalent weight polyol and water. Commercially available polyether polyol products typically contain up to about 0.15% by weight water; water in such amounts carried into the process with the base polyol may be present, but it is generally preferred to avoid adding water in addition to such small amounts carried in with the base polyol.

The mixture of the base polyol mixture from step a) with the low equivalent weight polyol is preferably is maintained under agitation and/or turbulent flow conditions until the low equivalent weight polyol has reacted with isocyanate groups in the base polyol mixture to form polyisocyanate polyaddition particles. It is not necessary to maintain agitation until all isocyanate groups are consumed, provided that agitation is maintained until the particles have formed. Particle formation is indicated by a visible formation of a highly opaque dispersion. Typically agitation is maintained until at least 50%, preferably at least 75% of the isocyanate groups have been consumed.

The reaction of the low equivalent weight polyol can be performed at temperatures as described with respect to step (a) of the process. The starting materials may be at ambient temperature at the time the base polyol mixture and low equivalent weight polyol are mixed. Either or both of the components may be at an elevated temperature at the time of mixing. Such an elevated temperature preferably is no more than 80° C., more preferably no more than 70° C. and still more preferably no greater than 60° C. Because the reaction is exothermic, the temperature of the reaction mixture may increase as the reaction proceeds. As before, cooling can be applied to limit the temperature rise due to this exotherm.

A urethane catalyst may be present during the reaction between the base polyol mixture and the low equivalent weight polyol. Suitable catalysts are as described before. Residual catalyst from the foregoing step may remain in the base polyol and function as a catalyst in this step of the process. The use of a catalyst is preferred, although the process could be carried out without it if, for example, longer reaction times can be tolerated or if other measures, such as heating the reactants, are used to reduce the reaction time.

The amount of low equivalent weight polyol added preferably is sufficient to consume the isocyanate groups present, including isocyanate groups that remain after step a) of this process as well as any additional isocyanate groups as may be added during step b). A large excess of low equivalent weight polyol is not necessary, and for that reason it is preferred to add no more than 2 equivalents thereof per equivalent of those isocyanate groups. An especially preferred amount is 1.05 to 1.75 or 1.3 to 1.6 equivalents of the low equivalent weight polyol per equivalent of isocyanate groups.

In terms of weight, about 1 to 50 parts of the low equivalent weight polyol per 100 parts by weight of base polyol typically are used, although this will vary with the amount of isocyanate groups present in the mixture formed in step (a) of the process and any additional polyisocyanate(s) added to such mixture. A preferred amount is at least 2 parts, more preferably at least 3 parts per 100 parts by weight of base polyol. A preferred upper amount is up to 30 parts, more preferably up to 20 parts by weight per 100 parts by weight of the base polyol. In some specific embodiments, 3 to 10 or 3 to 7 parts by weight are used per 100 parts by weight of base polyol.

The reaction of the low equivalent weight polyol to form polyisocyanate polyaddition particles typically requires from 30 seconds to one hour, although the time required depends on factors such as temperature. A more preferred time of reaction is 1 minute to 10 minutes, and in specific embodiments is 2 to 7 minutes. A somewhat longer time may be required for essentially all of the isocyanate groups to react.

If desired, more of the polyisocyanate can be added after step a) of this process, although the process can be practiced without doing so. This may be desirable, for example, if a higher solids dispersion is desired. If more polyisocyanate is added after step a), that additional polyisocyanate can be added prior to, simultaneously with, or after the addition of the low equivalent weight polyol. The polyisocyanate added at this stage can be the same or different as the one added in step a) of the process.

In a preferred process, the base polyol is brought to a temperature of 20 to 60° C., and step a) of the process is then performed as described above, maintaining the reaction mixture within the same temperature range. Upon the completion of step a), the low equivalent weight polyol is added to the reaction mixture, preferably in the same reaction equipment, and the mixture is then allowed to react, at the foregoing temperature or in some cases a higher temperature produced from the exotherm of the reaction, until a dispersion of the polyisocyanate polyaddition particles in the base polyol has formed.

The process of the invention can be performed batch-wise, in a semi-batch process, or continuously.

In a batch process, the base polyol, catalyst and polyisocyanate can be charged into suitable reaction equipment and allowed to react as described above, followed by the addition of the low equivalent weight polyol (and optionally additional polyisocyanate), preferably into the same reaction equipment, and reaction of the low equivalent weight polyol. The vessel preferably is stirred or otherwise agitated during the process.

In an embodiment of a continuous process, the base polyol, catalyst and polyisocyanate can be brought together in a mixhead to form a mixture which is injected or otherwise introduced into a tubular (e.g., a tube, pipe or hose) reactor. The mixture of base polyol and polyisocyanate react as described before as the mixture passes through an initial portion of the tubular reactor. At one or downstream points, selected such that the reaction of base polyol and polyisocyanate have reacted as described before, the low equivalent weight polyol (and optionally additional polyisocyanate compound) is then introduced into the tubular reactor and mixed with the base polyol mixture formed upstream in the tubular reactor. The reaction can then be completed in the tubular reactor. Alternatively, the contents of the tubular reactor can be discharged into another vessel, such as a continuous stirred tank reactor, where the reaction of the low equivalent weight polyol to form polyisocyanate polyaddition particles is completed.

Upon completion of the reaction, the reaction mixture can be stripped or otherwise treated to remove unreacted materials, volatile reaction by-products, and the like. Stripping can be performed by applying vacuum, preferably coupled with an elevated temperature. A stripping agent can be bubbled through the product to facilitate removal of these materials. Filtering of the PIPA polyol can be performed if desired, but an advantage of this invention is that large, unstable agglomerates tend to be formed in very small quantities if at all, making filtering unnecessary in many cases. Thus, in some embodiments, a filtering step can be omitted, and the PIPA polyol used without filtration.

Although not necessary, other emulsifiers, such as ionic surfactants and nonionic surfactants including compounds having hydrophilic, internal or terminal poly(ethylene oxide) chains, can be added into the process during or before step (b) of the process. However, in preferred processes of the invention, no such additional emulsifiers are present.

The product is a dispersion of polyisocyanate polyaddition (PIPA) particles in the base polyol. The dispersion may contain 1 to 50% by weight of the dispersed PIPA particles. For purposes of this invention, the weight of the dispersed PIPA particles is taken to be that of the combined weight of the polyisocyanate and the low equivalent weight polyol added into the process. The dispersion preferably contains 8 to 30% dispersed PIPA particles and more preferably 8 to 25%, and in some embodiments 8 to 15% dispersed PIPA particles.

An advantage of this invention is that the dispersions are highly stable with small particles. The size of the dispersed PIPA particles typically fall within the range of 0.05 to 20 µm, as measured by laser scattering. In preferred embodiments, at least 90 volume-% of the particles have a particle size of 0.05 to 10 µm, and in more preferred embodiments at least 90 volume-% of the particles have a particle size of 0.05 to 5 µm.

In some embodiments, a bimodal or multimodal distribution of particle sizes is produced.

In all cases, a small fraction of larger agglomerates of primary particles may be present. However, these agglomerates tend to remain stably dispersed in the base polyol.

In some embodiments, the dispersion has a viscosity of 500 to 20,000 mPa·s at 20° C. and a solids level of at least 10 weight percent. In other embodiments, the viscosity at 20° C. is 750 to 5000 mPa·s or 750 to 2500 mPa·s, and the solids level is at least 10 weight percent.

The particles are believed to be at least partially stabilized against settling by the adduct formed in the reaction between the base polyol and the polyisocyanate. This adduct is believed to further react with the low equivalent weight polyol and in that way becomes grafted onto the polyisocyanate polyaddition particles. The hydroxyl-terminated chains corresponding to the residue of the base polyol molecules are believed to be at least partially soluble in the remaining base polyol, and so help to maintain the polyisocyanate polyaddition particles in suspension.

A dispersion made in accordance with the invention is useful in making polyurethanes by reaction with a polyisocyanate. Because the hydroxyl groups of the base polyol are mainly secondary hydroxyl groups, the dispersion is useful for making slabstock and molding conventional flexible polyurethane foam.

In the slabstock foaming process, the dispersion of the invention is combined with a polyisocyanate and reacted in the presence of a blowing agent to form the foam. The mixed starting materials are dispensed into a region, typically a trough, in which they react and rise without constraint or under minimal constraint (such as the weight of a plastic film) and cures to form the foam. Suitable methods for making slabstock polyurethane foam are described, for example, in U.S. Pat. No. 5,582,840 and U.S. Pat. No. 4,970,243.

Suitable polyisocyanates for use in making slabstock and/or molding conventional flexible polyurethane foam include those described above.

Suitable blowing agents include physical (endothermic) blowing agents such as various low-boiling chlorofluorocarbons, fluorocarbons, hydrocarbons and the like. Chemical (exothermic) blowing agents that decompose or react under the conditions of the polyurethane-forming reaction are also useful. By far the most preferred chemical blowing agent is water, which reacts with isocyanate groups to liberate carbon dioxide and form urea linkages. Water is preferably used as the sole blowing agent, in which case about 1 to about 7, especially from about 2 to about 5, parts by weight water are typically used per 100 parts by weight high equivalent weight polyol. Water may also be used in combination with a physical blowing agent, particularly a fluorocarbon or hydrocarbon blowing agent. In addition, a gas such as carbon dioxide, air, nitrogen or argon may be used as the blowing agent in a frothing process. Carbon dioxide can also be used as a liquid or as a supercritical fluid.

It is highly preferred to include a surfactant in the foam formulation. A wide variety of silicone surfactants as are commonly used in making polyurethane foams can be used in making the foams with the polymer polyols or dispersions of this invention. Examples of such silicone surfactants are commercially available under the tradenames Tegostab™ (Evonik), Niax™ (Momentive) and Dabco™ (Air Products and Chemicals).

In addition to the foregoing components, the polyurethane foam formulation may contain various other optional ingredients such as other polyols, crosslinkers, chain extenders, cell openers, FR agents; fillers such as melamine, polyethylene beads, recycled polyurethane foam, calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; and the like.

In specific embodiments, the invention is:

1. A process for preparing a dispersion of polyisocyanate polyaddition particles in a base polyol, comprising
    a) combining (1) 1 to 50 parts by weight of a polyisocyanate having an isocyanate equivalent weight of up to 300 and (2) 100 parts by weight of one or more liquid base polyether polyols, the base polyether polyol(s) having an average hydroxyl equivalent weight of at least 200, a nominal hydroxyl functionality of at least 2.5, wherein at least 75% of the hydroxyl groups of the base polyol are secondary hydroxyl groups, and reacting the polyisocyanate with the polyether polyol while mixing to produce a mixture containing unreacted base polyol, unreacted polyisocyanate compound and one or more isocyanate group-containing adducts of the base polyol with the polyisocyanate;
    b) then dispersing (3) a low equivalent weight polyol having an equivalent weight of up to 80 and 2 to 6 hydroxyl groups per molecule and optionally additional polyisocyanate into the mixture formed in step a), provided enough of the low equivalent weight polyol is provided to consume the isocyanate groups provided by the mixture formed in step a) and said additional polyisocyanate if any, and reacting the low equivalent weight polyol with the isocyanate groups to form polyisocyanate polyaddition particles dispersed in the base polyether polyol.

2. The process of embodiment 1 wherein the base polyol has a hydroxyl equivalent weight of at least 400.

3. The process of embodiment 1 or 2 wherein the base polyol has an average nominal hydroxyl functionality of at least 3.0.

4. The process of any of embodiments 1-3 wherein at least 85% of the hydroxyl groups of the base polyol are secondary hydroxyl groups.

5. The process of any of embodiments 1-3 wherein at least 95% of the hydroxyl groups of the base polyol are secondary hydroxyl groups.

6. The process of any preceding numbered embodiment wherein the base polyol is a nominally trifunctional poly(propylene oxide) homopolymer having a hydroxyl equivalent weight of 900 to 1350, a nominally trifunctional random copolymer of 80 to 99.5% by weight propylene oxide and 0.5 to 20% by weight ethylene oxide having a hydroxyl equivalent weight of 900 to 1350 and in which 92 to 100% of the hydroxyl groups are secondary hydroxyl groups, or a mixture of two or more such polyols.

7. The process of any preceding numbered embodiment wherein the low equivalent weight polyol contains at least two hydroxyl groups and zero or one primary or secondary amine groups.

8. The process of any preceding numbered embodiment wherein the low equivalent weight polyol contains at least two primary hydroxyl groups or is an aminoalcohol.

9. The process of any preceding numbered embodiment, wherein the low equivalent weight polyol is triethanolamine or a mixture containing at least 75% by weight of triethanolamine.

10. The process of any preceding numbered embodiment, wherein the polyisocyanate includes toluene diisocyanate or diphenylmethanediisocyanate.

11. A process for preparing a dispersion of polyisocyanate polyaddition particles in a base polyol, comprising
    a) combining (1) 1 to 50 parts by weight of toluene diisocyanate and (2) 100 parts by weight of a liquid base polyether polyol, wherein the base polyol is a nominally trifunctional poly(propylene oxide) homopolymer having a hydroxyl equivalent weight of 900 to 1350, a nominally trifunctional random copolymer of 80 to 99.5% by weight propylene oxide and 0.5 to 20% by weight ethylene oxide having a hydroxyl equivalent weight of 900 to 1350 in which 85 to 100% or 92 to 100% of the hydroxyl groups are secondary hydroxyl groups, or a mixture of two or more such polyols, and reacting the polyisocyanate with the base polyether polyol while mixing to produce a mixture containing unreacted base polyol, unreacted polyisocyanate compound and one or more isocyanate group-containing adducts of the base polyol with the polyisocyanate;
    b) then dispersing (3) triethanolamine or a mixture of 75 to 99.9% by weight triethanolamine and 0.1 to 25% by weight of one or more other polyols having a hydroxyl equivalent weight of up to 80 and 2 to 6 hydroxyl groups per molecule and optionally additional polyisocyanate into the mixture formed in step a), provided enough of the triethanolamine or mixture is provided to consume the isocyanate groups provided by the mixture formed in step a) and said additional polyisocyanate if any, and reacting the triethanolamine or mixture with the isocyanate groups to form polyisocyanate polyaddition particles dispersed in the base polyether polyol.

12. The process of any preceding numbered embodiment, wherein in step (a), 1 to 30% of the hydroxyl groups of the base polyether polyol react with isocyanate groups.

13. The process of any preceding numbered embodiment, wherein in step (a), 1 to 15% of the hydroxyl groups of the base polyether polyol react with isocyanate groups.

14. The process of any preceding numbered embodiment, wherein step (a) is performed in the presence of a urethane catalyst.

15. The process of embodiment 14, wherein steps a) and b) each are performed in the presence of a urethane catalyst.

16. The process of any preceding numbered embodiment, wherein steps a) and b) each are performed in the absence of a tin catalyst.

17. The process of any preceding numbered embodiment, wherein step (a) is performed by mixing the base polyol and polyisocyanate are mixed while at a temperature of 20 to 60° C.

18. The process of any preceding numbered embodiment wherein in step (a), the base polyol and polyisocyanate are reacted for 5 seconds to 5 minutes before performing step (b).

19. The process of any preceding numbered embodiment wherein step (b) is performed at a temperature of 20 to 60° C.

20. The process of any preceding numbered embodiment wherein steps (a) and (b) are performed in the absence of an ionic surfactant, a silicone surfactant or a nonionic surfactant compound having one or more hydrophilic, internal or terminal poly(ethylene oxide) chains.

21. The process of any preceding numbered embodiment, wherein steps (a) and (b) are performed in the presence of up to 2 weight percent water, based on the combined weights of based polyol, polyisocyanate, low equivalent weight polyol and water.

22. The process of any preceding numbered embodiment, wherein steps (a) and (b) are performed in the presence of 0 to 0.25% by weight percent water, based on the combined weights of based polyol, polyisocyanate, low equivalent weight polyol and water.

23. The process of any preceding numbered embodiment, wherein step (b) is performed in the presence of a preformed PIPA polyol.

24. The process of any preceding numbered embodiment, which is performed continuously.

25. The process of embodiment 24, wherein step (a) is performed by continuously bringing the base polyol and polyisocyanate together in a mixhead to form a mixture which is continuously introduced into a tubular reactor where the base polyol and polyisocyanate react as the mixture passes through an initial portion of the tubular reactor to form a base polyol mixture, and step (b) is performed by introducing the low equivalent weight polyol and optionally an additional polyisocyanate compound into a downstream section of the tubular reactor and mixing it with the base polyol mixture formed in step (a), and then completing the reaction of the low equivalent weight polyol.

26. The process of any preceding numbered embodiment, wherein the dispersion has a solids content of 2 to 50% by weight.

27. The process of any preceding numbered embodiment, wherein the dispersion has a solids content of 8 to 25% by weight.

28. The process of any preceding numbered embodiment, wherein at least 90 volume-% of the particles have a particle size of 0.1 to 5 μm.

29. The process of any preceding numbered embodiment, wherein the dispersion has a viscosity of 750 to 20,000 mPa·s at 20° C. with a solid content of at least 10%.

30. A dispersion of polyisocyanate polyaddition particles in a base polyether polyol made in accordance with the process of any of embodiments 1-29.

31. A polyurethane made by reacting the dispersion of claim 30 with a polyisocyanate.

32. The polyurethane of embodiment 31 which is a flexible polyurethane foam prepared in a slabstock process.

The following examples are provided to illustrate the invention, but are not intended to limit the scope thereof. All parts and percentages are by weight unless otherwise indicated. All viscosities are at 20° C.

EXAMPLE 1 AND COMPARATIVE SAMPLES A, B AND C

Polyol A is a 3500 molecular weight, nominally trifunctional copolymer of 92% propylene oxide and 8% ethylene oxide. It is made using a potassium hydroxide catalyst, the residues of which have been removed. It contains about 0.1% by weight water. Fewer than 2% of its hydroxyl groups are primary, the remainder being secondary hydroxyls.

The Seed PIPA polyol is a 10% solids PIPA polyol made by conventional means using a base polyol having mainly primary hydroxyl groups and TEOA (see WO 2012/154831).

88 parts of Polyol A and 2 parts of a seed PIPA polyol are charged into a high speed laboratory mixer. With rapid stirring, 5.32 parts of a room temperature toluene diisocyanate (80% 2,4-isomer, "80/20 TDI") are added. After the toluene diisocyanate addition is completed, the mixture is stirred for 60 seconds, followed by addition of 0.4 parts of tin octoate catalyst. After additional 60 seconds of stirring, 4.69 parts of room temperature 99% pure triethanolamine are added with continued mixing. Mixing is continued for 300 seconds, during which time polyisocyanate polyaddition particles form. The particles remain suspended in the base polyol for a period of more than 3 months at room temperature. Product viscosity is 2300 mPa·s. Such a PIPA polyol is useful to produce good conventional polyurethane flexible foam.

Comparative Sample A is made using the same reactants and same amounts as Example 1, but following a conventional PIPA polyol manufacturing process as described in the examples of WO 94/20558. Changes to the catalyst package are also made to accommodate the process changes. With Comparative Sample A, the triethanolamine, catalyst, seed PIPA polyol and base polyol are combined first, mixed until the triethanolamine is dispersed, and then the 80/20 TDI is added. Polyisocyanate polyaddition particles form, but flake out almost immediately, confirming that the conventional PIPA polyol process as described in WO 94/20558 cannot be used with low reactivity polyols containing secondary hydroxyls at this level of seed PIPA polyol. Increasing the amount of this seed PIPA polyol will introduce significant amounts of primary hydroxyl groups into the product, which is disadvantageous because it will increase the product reactivity and sensitivity to tin catalyst levels in a conventional slabstock foam process.

Comparative Samples B and C are made in the same manner as Comparative Sample A, except the catalyst is 0.2 parts of a zinc carboxylate in the case of Comparative Sample B and 0.2 parts of a dialkyltin carboxylate in the case of Comparative Sample C. In both cases and as with Comparative Example A, the polyisocyanate polyaddition particles form and almost immediately flake out of the dispersion.

EXAMPLES 2 AND 3

Polyol B is a nominally trifunctional copolymer of propylene oxide and ethylene oxide having a hydroxyl number of about 48. It is made using a zinc hexacyanocobaltate catalyst complex. It contains about 0.1% by weight water. No more than 15% of its hydroxyl groups are primary, with the remainder of the hydroxyl groups being secondary hydroxyls.

To make Example 2, 87.68 parts of room temperature Polyol B are mixed for two minutes with 0.2 part of a zinc carboxylate catalyst, 2 parts of a seed PIPA polyol, 0.1 part of a triethylenediamine catalyst solution and 5.52 parts of 80/20 TDI on a laboratory high-speed mixer, at which time 4.5 parts of triethanolamine are added with continued mixing. Mixing is continued without applied heat for another 5 minutes, at which time a stable PIPA dispersion is obtained.

Particle size is measured using a Beckman Coulter LS Particle Size Analyzer. Essentially all particles are between 0.1 and 1 µm in size. The viscosity of the dispersion is measured using a Bohlin rheometer with cone-and-plate geometry, operated in a rotational mode at 20° C. The viscosity is recorded at its equilibrium value. The viscosity is 9150 mPa·s. OH number is 58.

To make Example 3, a mixture of 87.58 parts of Polyol B, 2 parts of the seed PIPA polyol described in Example 1, 0.2 parts of the zinc carboxylate catalyst and 0.05 part of the triethylenediamine catalyst solution is heated to 50° C. and stirred for 60 seconds. To this heated mixture is added 5.52 parts of toluene diisocyanate (80% 2,4-isomer), followed by mixing for two minutes. Then 4.5 parts triethanolamine are added, and mixing is continued for another 5 minutes to produce a stable dispersion having very small dispersed PIPA particles (in between 0.1 and 0.5 µm). Final PIPA polyol viscosity at 20° C. is 5400 mPa·s. OH number is 61.1.

The lower viscosity of Example 3 compared to Example 2 is believed to be due to a smaller extent of reaction between the base polyol and the polyisocyanate in the first step, at least in part because of the reduction in the amount of catalyst.

Example 3 has a narrower particle size distribution than Example 2. This may be attributable to the preheating of the base polyol in Example 3. This reduces the viscosity of TEOA, which may permit the triethanolamine to disperse better into the base polyol mixture. In any case, it is surprising to get such a narrow distribution of fine PIPA particles in the final PIPA polyol, using the process of reacting TEOA last.

EXAMPLES 4 AND 5

To make Example 4, 87.76 parts of room temperature Polyol B are mixed with 0.2 parts of a zinc carboxylate catalyst, 2 parts of a seed PIPA polyol, and 6.52 parts of a polymeric MDI (32% isocyanate groups, functionality 2.3) on a laboratory high-speed mixer for two minutes, at which time 3.52 parts of triethanolamine are added with mixing. Mixing is continued without applied heat for another 5 minutes, at which time a stable PIPA dispersion is obtained.

A bimodal particle size is seen, with a major fraction of particles having sizes from 0.05 to 1 µm and another almost equally large fraction having a size between 1 and 5 µm in size. Viscosity is 3400 mPa·s.

To make Example 5, a mixture of 87.68 parts of Polyol B, 2 parts seed PIPA polyol, 0.2 parts of the zinc carboxylate catalyst and 0.1 part of the triethylenediamine catalyst solution is prepared on a high speed mixture. To this mixture is added 6.52 parts of the polymeric MDI, followed by mixing for two minutes. Then 3.52 parts triethanolamine are added, and mixing is continued for another 5 minutes to produce a stable dispersion having very small dispersed PIPA particles.

The resulting dispersion has a monomodal particle size distribution, with essentially all particles between 0.05 and 0.5 µm in size. Viscosity is 5650 mPa·s.

EXAMPLES 6-8

Each of Examples 6-8 are made by mixing 88 parts of Polyol A, 2 parts of the seed PIPA polyol, 0.2 parts of the zinc carboxylate catalyst, 0.02 parts of the dialkyltin carboxylate catalyst, 5.76 parts toluene diisocyanate (80% 2,4-isomer) and 4.69 parts of triethanolamine. All components are at room temperature when added. The order of mixing for these experiments is as follows:

Example 6: Mix Polyol A, seed PIPA polyol and toluene diisocyanate on the high speed mixer for 30 seconds, add the catalysts, mix another 30 seconds (total pre-reaction time 60 seconds), then add the triethanolamine. Mix for an additional 5 minutes.

Example 7: Mix Polyol A, seed PIPA polyol and toluene diisocyanate on the high speed mixer for 60 seconds, add the catalysts, mix another 60 seconds (total pre-reaction time 120 seconds), then add the triethanolamine. Mix for an additional 5 minutes.

Example 8: Mix Polyol A, seed PIPA polyol and toluene diisocyanate on the high speed mixer for 90 seconds, add the catalysts, mix another 90 seconds (total pre-reaction time 180 seconds), then add the triethanolamine. Mix for an additional 5 minutes.

Results are as summarized in Table 1 below.

TABLE 1

| | Sample | | |
|---|---|---|---|
| | Example 6 | Example 7 | Example 8 |
| Pre-reaction time, s | 60 | 120 | 180 |
| Viscosity, mPa · s | 3050 | 4400 | 4550 |
| Hydroxyl number, mg KOH/g | 61.8 | 62.1 | Not measured. |
| Particle size | Bimodal, with larger volume fraction between 1 and 20 µm (centered at about 5 µm) and smaller volume fraction between 0.05 and 0.5 µm. | Trimodal, with largest volume fraction between 1 and 5 µm, a smaller volume fraction between 0.05 and 0.5 µm and a still smaller volume fraction between 10 and 20 µm. | Polymodal, with large volume fractions between 0.05 and 0.8 µm and another large volume fraction between 1 and 5 µm. |

The longer the pre-reaction time, the higher the final viscosity of the PIPA polyol. The low OH numbers confirm that there is no unreacted TEOA present in the final PIPA polyol. Stable particles have all small sizes. Hence good grafting of the PIPA polymer has been obtained by reacting TEOA last.

EXAMPLES 9-12

Examples 9 and 10 are made by mixing 87.78 parts of Polyol B, 2 parts of the seed PIPA polyol, 0.2 parts of the zinc carboxylate catalyst, 0.025 parts of the dialkyltin carboxylate catalyst, 5.52 parts toluene diisocyanate (80% 2,4-isomer) and 4.5 parts of triethanolamine. The polyol is preheated to 40° C.; all other components are at room temperature when added.

In Example 11, the amount of Polyol B is reduced to 86.78 parts and in Example 12 the amount of Polyol B is 87.28 parts.

The order of mixing for these experiments is as follows:

Example 9: Mix Polyol B, seed PIPA polyol and tin catalyst on the high speed mixer for 60 seconds, add the toluene diisocyanate, mix another 90 seconds, add the zinc catalyst, mix another 30 seconds, then add the triethanolamine over 30 seconds. Mix for an additional 90 seconds.

Example 10: Mix Polyol B, seed PIPA polyol and catalysts on the high speed mixer for 60 seconds, add the toluene diisocyanate, mix another 120 seconds, then add the triethanolamine over 30 seconds. Mix for an additional 90 seconds.

Example 11: Mix Polyol B, seed PIPA polyol and catalysts on the high speed mixer for 60 seconds, add the toluene diisocyanate, mix another 150 seconds, add the triethanolamine over 30 seconds. Then mix for an additional 90 seconds.

Example 12: Mix Polyol B, seed PIPA polyol and catalysts on the high speed mixer for 60 seconds, add the toluene diisocyanate, mix another 180 seconds, add the triethanolamine over 30 seconds. Then mix for an additional 90 seconds.

Particle size, and viscosity are measured for each of these products, and are as reported in Table 2.

TABLE 2

| | Sample | | | |
|---|---|---|---|---|
| | Example 9 | Example 10 | Example 11 | Example 12 |
| Viscosity, mPa · s | 3200 | 2500 | 3300 | 3800 |
| Particle size | Bimodal, with larger volume fraction between 2 and 20 μm (centered at about 5 μm) and smaller volume fraction between 0.05 and 0.5 μm. | Bimodal, with larger volume fraction between 1 and 6 μm (centered at 3 μm, a smaller volume fraction between 0.05 and 0.5 μm. | Bimodal, with a large volume fraction between 0.05 and 0.5 μm and another large volume fraction between 1 and 5 μm. | Bimodal, with the larger volume fraction between 0.05 and 0.6 μm, and a smaller volume fraction at 0.8 to 3 μm. |

Examples 9 to 12 show the flexibility and the robustness of the process of the invention. All of Examples 9 to 12 are good dispersions despite the differences in pre-reaction times used. Longer pre-reaction times correlate to higher final PIPA polyol viscosities.

What is claimed is:

1. A process for preparing a dispersion of polyisocyanate polyaddition particles in a base polyol, comprising
   a) combining (1) 1 to 50 parts by weight of a polyisocyanate having an isocyanate equivalent weight of up to 300 and (2) 100 parts by weight of one or more liquid base polyether polyols, the base polyether polyol(s) having an average hydroxyl equivalent weight of at least 200, a nominal hydroxyl functionality of at least 2.5, wherein at least 75% of the hydroxyl groups of the base polyol are secondary hydroxyl groups, and reacting the polyisocyanate with the polyether polyol while mixing to produce a mixture containing unreacted base polyol, unreacted polyisocyanate compound and one or more isocyanate group-containing adducts of the base polyol with the polyisocyanate;
   b) then dispersing (3) a low equivalent weight polyol having an equivalent weight of up to 80 and 2 to 6 hydroxyl groups per molecule and optionally additional polyisocyanate into the mixture formed in step a), wherein 1.05 to 1.75 equivalents of the low equivalent weight polyol are provided per equivalent of isocyanate groups provided by the mixture formed in step a) and said additional polyisocyanate if any, and reacting the low equivalent weight polyol with the isocyanate groups to form polyisocyanate polyaddition particles dispersed in the base polyether polyol.

2. The process of claim 1 wherein at least 85% of the hydroxyl groups of the base polyol are secondary hydroxyl groups.

3. The process of claim 1 wherein the base polyol is at least one polyol selected from i) a nominally trifunctional poly(propylene oxide) homopolymer having a hydroxyl equivalent weight of 900 to 1350, and ii) a nominally trifunctional random copolymer of 80 to 99.5% by weight propylene oxide and 0.5 to 20% by weight ethylene oxide, based on the combined weight of the propylene oxide and ethylene oxide, the random copolymer having a hydroxyl equivalent weight of 900 to 1350, wherein 92 to 100% of the hydroxyl groups of the base polyol are secondary hydroxyl groups.

4. The process of claim 1, wherein the low equivalent weight polyol is triethanolamine or a mixture containing at least 75% by weight of triethanolamine by weight of the mixture.

5. The process of claim 1, wherein the polyisocyanate includes toluene diisocyanate or diphenylmethanediisocyanate.

6. A process for preparing a dispersion of polyisocyanate polyaddition particles in a base polyol, comprising
   a) combining (1) 1 to 50 parts by weight of toluene diisocyanate and (2) 100 parts by weight of a liquid base polyether polyol, wherein the base polyol is at least one polyol selected from i) a nominally trifunctional polypropylene oxide) homopolymer having a hydroxyl equivalent weight of 900 to 1350, and ii) a nominally trifunctional random copolymer of 80 to 99.5% by weight propylene oxide and 0.5 to 20% by weight ethylene oxide, based on the combined weight of the propylene oxide and ethylene oxide, the random copolymer having a hydroxyl equivalent weight of 900 to 1350, wherein 85 to 100% of the hydroxyl groups of the base polyol are secondary hydroxyl groups, and reacting the toluene diisocyanate with the base polyether polyol while mixing to produce a mixture containing unreacted base polyol, unreacted toluene diisocyanate and one or more isocyanate group-containing adducts of the base polyol with the toluene diisocyanate;

b) then dispersing (3) triethanolamine or a mixture of 75 to 99.9% by weight triethanolamine and 0.1 to 25% by weight, based on the weight of the mixture, of one or more other polyols having a hydroxyl equivalent weight of up to 80 and 2 to 6 hydroxyl groups per molecule and optionally additional toluene diisocyanate into the mixture formed in step a), wherein 1.05 to 1.75 equivalents of the triethanolamine or mixture are provided per equivalent of isocyanate groups provided by the mixture formed in step a) and said additional toluene diisocyanate if any, and reacting the triethanolamine or mixture with the isocyanate groups to form polyisocyanate polyaddition particles dispersed in the base polyether polyol.

7. The process of claim 6, wherein in step a), 1 to 30% of the hydroxyl groups of the base polyether polyol react with isocyanate groups.

8. The process of claim 6, wherein steps a) and b) each are performed in the absence of a tin catalyst.

9. The process of claim 6 wherein in step (a), the base polyol and polyisocyanate are reacted for 5 seconds to 5 minutes before performing step (b).

10. The process of claim 6 wherein steps (a) and (b) are performed in the absence of an ionic surfactant, a silicone surfactant or a nonionic surfactant compound having one or more hydrophilic, internal or terminal poly(ethylene oxide) chains.

11. The process of claim 6, wherein steps (a) and (b) are performed in the presence of up to 2 weight percent water, based on the combined weights of base polyol, polyisocyanate, low equivalent weight polyol and water.

12. The process of claim 6, wherein step (b) is performed in the presence of a preformed PIPA polyol.

13. The process of claim 6, wherein step (a) is performed by continuously bringing the base polyol and toluene diisocyanate together in a mixhead to form a mixture which is continuously introduced into a tubular reactor where the base polyol and toluene diisocyanate react as the mixture passes through an initial portion of the tubular reactor to form a base polyol mixture, and step (b) is performed by introducing the low equivalent weight polyol and optionally an additional toluene diisocyanate into a downstream section of the tubular reactor and mixing it with the base polyol mixture formed in step (a), and then completing the reaction of the low equivalent weight polyol.

14. The process of claim 6, wherein the dispersion has a solids content of 8 to 25% by weight.

15. The process of claim 6, wherein at least 90 volume-% of the particles have a particle size of 0.1 to 5 μm.

16. The process of claim 6, wherein the dispersion has a viscosity of 750 to 20,000 mPa·s at 20° C. with a solid content of at least 10% weight percent.

17. A dispersion of polyisocyanate polyaddition particles in a base polyether polyol made in accordance with the process of claim 1.

18. A dispersion of polyisocyanate polyaddition particles in a base polyether polyol made in accordance with the process of claim 6.

* * * * *